United States Patent
Tang

(10) Patent No.: US 10,200,255 B2
(45) Date of Patent: Feb. 5, 2019

(54) GENERATING FUNCTION MODEL BASED ON OPERATOR OBJECTIVES

(71) Applicant: NOKIA SOLUTIONS AND NETWORKS OY, Espoo (FI)

(72) Inventor: Haitao Tang, Espoo (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 153 days.

(21) Appl. No.: 15/179,077

(22) Filed: Jun. 10, 2016

(65) Prior Publication Data

US 2016/0366027 A1 Dec. 15, 2016

(30) Foreign Application Priority Data

Jun. 12, 2015 (EP) ..................................... 15171772

(51) Int. Cl.
*H04L 12/24* (2006.01)
*H04W 24/02* (2009.01)

(52) U.S. Cl.
CPC ........ *H04L 41/145* (2013.01); *H04L 41/0893* (2013.01); *H04W 24/02* (2013.01)

(58) Field of Classification Search
None
See application file for complete search history.

(56) References Cited

U.S. PATENT DOCUMENTS

| 2012/0039175 A1 | 2/2012 | Sridhar et al. | |
| 2013/0114446 A1* | 5/2013 | Liu | H04W 24/10 370/252 |
| 2014/0351418 A1* | 11/2014 | Toubiana | G06Q 30/02 709/224 |
| 2015/0089344 A1* | 3/2015 | Pickering | G06F 17/5004 715/215 |
| 2016/0134478 A1 | 5/2016 | Schmelz et al. | |

FOREIGN PATENT DOCUMENTS

| WO | WO 2010/132884 A1 | 11/2010 |
| WO | WO 2014/191469 A1 | 12/2014 |

OTHER PUBLICATIONS

Lars Christoph Schmetz, et al.; "Integrated SON Management—Policy Transformation and Operational SON Coordination (first results)"; INFSO-ICT-31684 SEMAFOUR D5.2; 2014, 70 pages.*
Lars Christoph Schmetz, et al.; "Integrated SON Management—Policy Transformation and Operational SON Coordination (first results)"; INFSO-ICT-31684 SEMAFOUR D5.2; 2014, 70 pages (Year: 2014).*
European Search Report dated Nov. 20, 2015 corresponding to European Patent Application No. 15171772.5.

* cited by examiner

*Primary Examiner* — Charles C Jiang
*Assistant Examiner* — Saad Khawar
(74) *Attorney, Agent, or Firm* — Squire Patton Boggs (US) LLP

(57) ABSTRACT

It is provided a method, comprising requesting a function model based on a received objective for a network; checking if a function model is received in response to the request for the function model; setting, if the function model is received, a policy function according to the received function model.

17 Claims, 3 Drawing Sheets

GENERATING FUNCTION MODEL BASED ON OPERATOR OBJECTIVES

FIELD OF THE INVENTION

The present invention relates to an apparatus, a method, and a computer program product related to self organizing networks. More particularly, the present invention relates to an apparatus, a method, and a computer program product related to a self organizing network based on operator objectives.

ABBREVIATIONS

3GPP 3rd Generation Partnership Project
Ack Acknowledge
ATM Asynchronous Transfer Mode
CM Configuration Management
FM Fault Management
IOC Information Object Class
IRP Integration Reference Point
KPI Key Performance Indicator
LTE Long Term Evolution
LTE-A LTE Advanced
M Mandatory
NCP Network Configuration Parameter
NRM Network Resource Manager
OP Operation
OS Objective Sequence
OSn OS number
OSSii Operation Support System interoperability initiative
PM Performance Management
Req Request
SCP SON function Configuration Parameter
SCV SCP Value
SON Self Organizing Network
TS Technical Specification
UI User Interface
URL Unified Resource Locator
WiFi Wireless Fidelity

BACKGROUND OF THE INVENTION

In Self-Organizing Networks (SON), most SON Functions work with their closed control loops, which react to certain dedicated Key Performance Indicators (KPIs)/counters of the network by updating the Network Configuration Parameters (NCP). The concept of SON Objective Manager and its Objective Model, Context Model, and Function Model is described e.g. in WO 2014/191469 A1. For example, a KPI may include a call drop rate, a handover success rate and/or a cell load. In general, a KPI may be calculated from one or more counters, and may also depend e.g. on other parameters detected at the network such as a fault status. A network configuration parameter may be e.g. a base station transmission power, a cell individual offset, a handover hysteresis, a time-to-trigger etc. Operator objectives are business policies, and/or strategic policies, and/or technical policies that may include conditions and/or that may include priorities. A context may describe the conditions which have to be fulfilled in order to apply a certain function model. Example parameters of a context are a time of the day, a weekday, a fault status of the network or a network element, a traffic load of the network or a network element, or an arbitrary combination thereof. A SON Function Model is related to an operator objective and includes at least one SON-Function Configuration Parameter Value may include at least one condition.

The earlier solution can be described with its three models and its mapping principle. Its three major models may be summarized as follows:

1. The Context Model provides a description of the context properties that can be used in the condition part of the objective rules. The Context Model may have the following general form:

{
contextProperty$_1$ HAS DOMAIN [propertyValuesMargin$_1$],
contextProperty$_2$ HAS DOMAIN [propertyValuesMargin$_2$],
...,
contextProperty$_n$ HAS DOMAIN [propertyValuesMargin$_n$]
}

2. The Objective Model represents what an operator would like its SON network to achieve. The Objective Model has the following general form:

{
IF condition$_1$ THEN objective$_1$ (e.g., KPI target$_1$) WITH precedence$_1$
IF condition$_2$ THEN objective$_2$ (e.g., KPI target$_2$) WITH precedence$_2$
...,
}

3. A SON Function Model is responsible for encoding a functional description of a specific SON function. It has the following general form:

{
SON Function
   Objective$_1$: SCVSet$_1^{SONFunction_i}$
   Objective$_2$: SCVSet$_2^{SONFunction_i}$
   ... : ...
   Objective$_n$: SCVSet$_n^{SONFunction_i}$
   ...
}

That is, a SONFunction (SONFunction i) may attempt to achieve one or more (n) objectives. For each (say Objective$_j$) of the objectives, a particular SCV (SCVSet$_j$) for this SONFunction is defined.

Its principle of mapping operator objectives into SON-function specific configurations may be summarized as shown in FIG. 1, taken from WO2014/191469.

FIG. 1 shows a functional architecture of SON Management with the function and interfaces of the SON Objective Manager, that provides methods and interfaces to automatically interconnect the operator objectives (for example, business, strategic and technical objectives) of the mobile network operator with the model descriptions of the SON functions deployed in the network, such that as the outcome of this interconnection process SCV Sets (which are, for example, configuration values and/or policies) for the SON Functions are generated that configure the SON Functions in such way that the operator objectives are met by the SON system.

In FIG. 1, a functional architecture of SON Management including the SON Objective Manager is shown. The SON Objective Manager itself is depicted as a rectangular box. The interfaces of the SON Objective Manager (which are explained in detail below) are depicted as pentagonal boxes. The data serving as input to the SON Objective Manager (Operator Objectives and SON Function Models), as well as the data provided as output by the SON Objective Manager (SCV Sets or Policies), are depicted as round-edge rectangular boxes. Furthermore, FIG. 1 shows two exemplary SON Functions which are also depicted as rectangular boxes. The SCPs of these SON Functions are depicted as circles. The arrows in FIG. 1 depict the data flow between the components of the SON Management.

Features of the SON Management architecture are for example:

The SON Function Model Interface may define the access to a machine understandable model of the behavior of each SON Function. Hence, the interface may provide access to information about how different SCV Sets of a specific SON Function satisfy possible operator objectives. The SON Function model that is accessed through the interface may be usually provided by the vendor of the SON Function. In order to enable the usage of SON Functions from different vendors, the SON Function Model Interface may be standardized in such a way that the SON Objective Manager can configure SON Functions from different vendors.

The Operator Objective Interface may define a standardized syntax for the description of operator objectives. The description of the operator objectives may be thereby coherent with the description of the operator objectives in the SON Function Model Interface, to enable the mapping between the objectives and the model.

Therefore, also the Operator Objective Interface may be standardized to ensure multi-vendor capabilities of the SON Objective Manager.

The SON Objective Manager may take the operator objectives and the technical description of each SON Function, may perform a reasoning process, and may determine a SCV Set for each SON Function. Since the SON Function Model Interface could also be standardized, thus the SON Objective Manager may create SCV Sets for SON Functions from different vendors. This may facilitate a high-level integration of multi-vendor SON Functions controlled by common operator objectives.

The SON Function Interface may describe the interconnection between the SON Objective Manager and the SON Functions. The SCV Sets as created by the SON Objective Manager may be provided to the SON Functions. Depending on the implementation the SCV Sets may include dedicated configuration settings for the SON Function, or may include a policy. In the context of the present application, the term "policy" is used for both "policy" and "configuration settings", unless otherwise indicated or made clear from the context. Furthermore, depending on the implementation of the SON Objective Manager, the SON Function Interface may be standardized. The SCV Sets of the SON Functions may be automatically adjusted based on the operator objectives.

Components used for the present approach, for example a SON Function Model Interface, an Operator Objective Interface, the SON Objective Manager, and a SON Function Interface, may be implemented in different ways.

SUMMARY OF THE INVENTION

It is an object of the present invention to improve earlier solutions.

According to a first example aspect of the invention, there is provided an apparatus, comprising model requesting means adapted to request a function model based on a received objective for a network; model checking means adapted to check if a function model is received in response to the request for the function model; policy setting means adapted to set, if the function model is received, a policy function according to the received function model.

The request may include an indication of the objective, and the indication includes a unified resource locator related to the objective.

The apparatus may further comprise measurement requesting means adapted to request a measurement model based on the received objective; measurement checking means adapted to check if the measurement model is received in response to the request for the measurement model; measurement setting means adapted to set, if the measurement model is received, a measurement function according to the received measurement model.

The measurement model may include at least one of a first counter to be measured and a performance indicator to be calculated based on a second counter and a third counter different from the second counter.

According to a second example aspect of the invention, there is provided an apparatus, comprising monitoring means adapted to monitor if a request for a function model is received, wherein the request includes an indication of an objective for a network; model retrieving means adapted to retrieve, if the request is received, based on the indication, the function model from a storage device; model providing means adapted to provide the function model in response to the request.

The indication may include a unified resource locator.

At least one of an objective data and the function model may be stored in a database on the storage device, and the objective data may correspond to the indication of the objective.

The apparatus may further comprise measurement retrieving means adapted to retrieve, if the request is received, an objective measurement model from the storage device, measurement providing means adapted to provide the objective measurement model in response to the request.

According to a third example aspect of the invention, there is provided an apparatus, comprising model requesting circuitry configured to request a function model based on a received objective for a network; model checking circuitry configured to check if a function model is received in response to the request for the function model; policy setting circuitry configured to set, if the function model is received, a policy function according to the received function model.

The request may include an indication of the objective, and the indication includes a unified resource locator related to the objective.

The apparatus may further comprise measurement requesting circuitry configured to request a measurement model based on the received objective; measurement checking circuitry configured to check if the measurement model is received in response to the request for the measurement model; measurement setting circuitry configured to set, if the measurement model is received, a measurement function according to the received measurement model.

The measurement model may include at least one of a first counter to be measured and a performance indicator to be calculated based on a second counter and a third counter different from the second counter.

According to a fourth example aspect of the invention, there is provided an apparatus, comprising monitoring circuitry configured to monitor if a request for a function model is received, wherein the request includes an indication of an objective for a network; model retrieving circuitry configured to retrieve, if the request is received, based on the indication, the function model from a storage device; model providing circuitry configured to provide the function model in response to the request.

The indication may include a unified resource locator.

At least one of an objective data and the function model may be stored in a database on the storage device, and the objective data may correspond to the indication of the objective.

The apparatus may further comprise measurement retrieving circuitry configured to retrieve, if the request is received, an objective measurement model from the storage device, measurement providing circuitry configured to provide the objective measurement model in response to the request.

According to a fifth example aspect of the invention, there is provided a method, comprising requesting a function model based on a received objective for a network; checking if a function model is received in response to the request for the function model; setting, if the function model is received, a policy function according to the received function model.

The request may include an indication of the objective, and the indication may include a unified resource locator related to the objective.

The method may further comprise requesting a measurement model based on the received objective; checking if the measurement model is received in response to the request for the measurement model; setting, if the measurement model is received, a measurement function according to the received measurement model.

The measurement model may include at least one of a first counter to be measured and a performance indicator to be calculated based on a second counter and a third counter different from the second counter.

According to a sixth example aspect of the invention, there is provided a method, comprising monitoring if a request for a function model is received, wherein the request includes an indication of an objective for a network; retrieving, if the request is received, based on the indication, the function model from a storage device; providing the function model in response to the request.

The indication may include a unified resource locator.

At least one of an objective data and the function model may be stored in a database on the storage device, and the objective data may correspond to the indication of the objective.

The method may further comprise retrieving, if the request is received, an objective measurement model from the storage device, providing the objective measurement model in response to the request.

Each of the methods of the fifth and sixth example aspects may be a method of generating a function model.

According to a seventh aspect of the invention, there is provided a computer program product comprising a set of instructions which, when executed on an apparatus, is configured to cause the apparatus to carry out the method according to any of the fifth and sixth example aspects. The computer program product may be embodied as a computer-readable medium or directly loadable into a computer.

According to some example embodiments of the invention, at least one of the following technical effects is provided:
 operator objectives and vendor know-how are optimally coordinated;
 alignment of operator objectives and function model are quickly aligned;
 the measurements are adapted quickly to the operator objectives.

It is to be understood that any of the above modifications can be applied singly or in combination to the respective example aspects to which they refer, unless they are explicitly stated as excluding alternatives.

BRIEF DESCRIPTION OF THE DRAWINGS

Further details, features, objects, and advantages are apparent from the following detailed description of example embodiments of the present invention which is to be taken in conjunction with the appended drawings, wherein.

DETAILED DESCRIPTION OF CERTAIN EXAMPLE EMBODIMENTS

Figure 1:
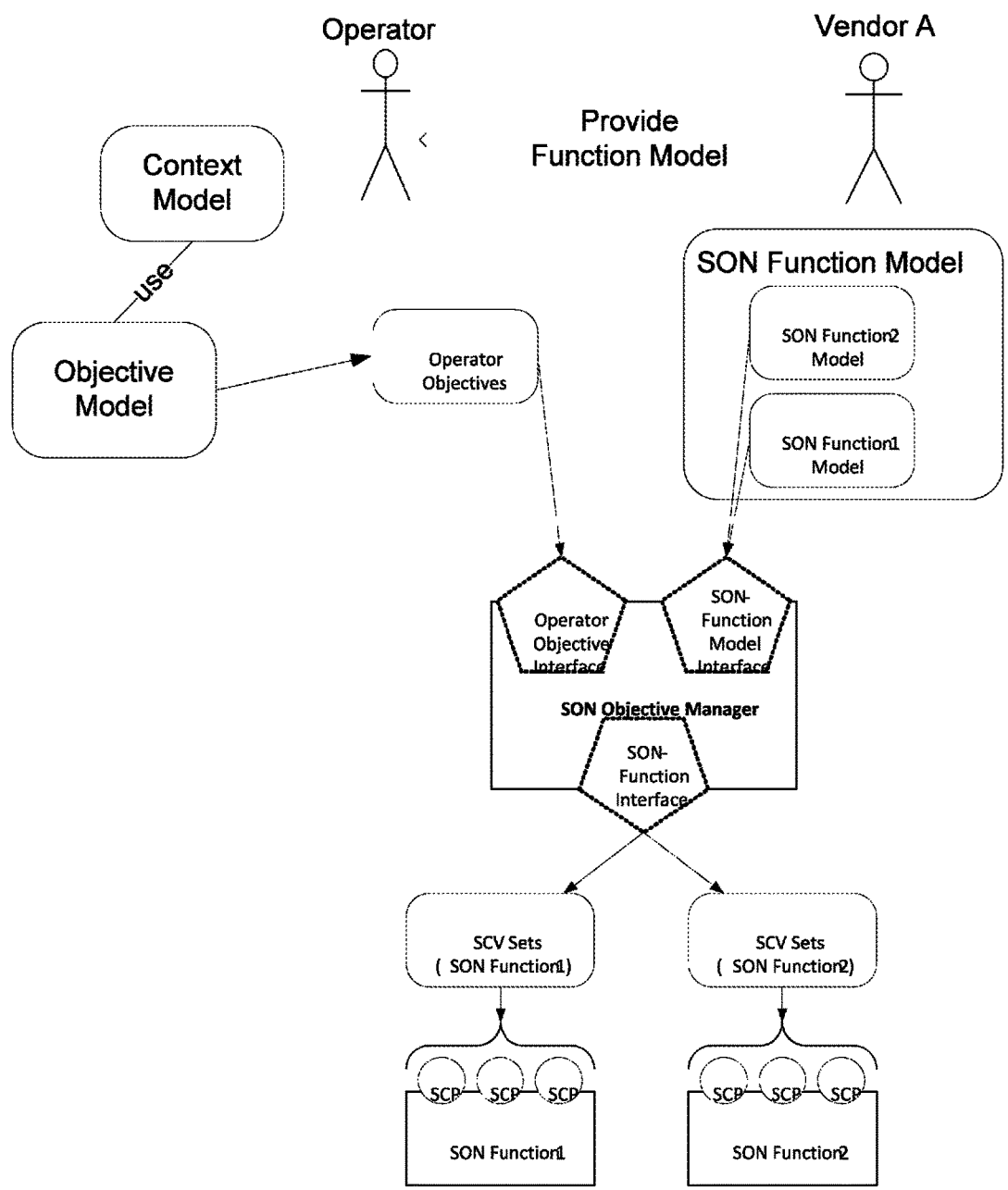
FIG. 1 shows a functional architecture according to an earlier solution.

Herein below, certain example embodiments of the present invention are described in detail with reference to the accompanying drawings, wherein the features of the example embodiments can be freely combined with each other unless otherwise described. However, it is to be expressly understood that the description of certain embodiments is given for by way of example only, and that it is by no way intended to be understood as limiting the invention to the disclosed details.

Moreover, it is to be understood that the apparatus is configured to perform the corresponding method, although in some cases only the apparatus or only the method are described.

The technical objectives of an operator may change during its actual network operation. The aims of the objectives (also named business objectives and/or strategic objectives) may change during actual network operation, too. The conditions of these objectives may also change during actual network operation. It is desired to define suitable function models based on the latest technical objectives so that the operations of the closely-matching functions pursue for the technical objectives. Therefore, if the (technical) objectives change, the function models would usually need to change accordingly.

However, the earlier solution of WO 2014/191469 does not define how (for a SON function vendor) to generate the corresponding function model according to the latest (technical) objective(s) of an operator during its network operation (Problem 1). In addition, the earlier solutions do not define how such a function model can be made available to the operator during its network operation, so that the corresponding SCV Policy sets can be generated and used right away (Problem 2).

Moreover, the earlier solutions do not define how to monitor the function's operation according to the specific (operator) technical objective(s) (Problem 3). That is, how to map the relevant vendor/function-specific measurements (KPIs, counters, etc.) into the values specific to operator tech objectives so that the operator can monitor the function's operation with regard to the operator (technical) objective(s).

Some example embodiments of this invention solve at least one of the aforementioned problems so that the enhanced SON Objective Manager and its related policy functions can be practically realized and applied in real network operations.

Example embodiments of the invention provide a method (Method A) where a vendor can define and update a SON Function Model according to the latest given operator technical objectives, any time before and during the actual network operations. Such method also enables the refinement of the operator technical objectives via an operator-vendor interworking during actual network operations. In addition, example embodiments of the invention define a method to provide an Objective Measurement Model and a method (Method B) for an operator to map the relevant vendor/function-specific measurements (KPIs, counters, etc.) into the values specific to the operator's technical objectives so that the operator can monitor the function's operation with regard to the operator's technical objective(s).

Thus, Methods A and B and the Objective Measurement Model enhance the SON Objective Manager (including its related policy functions) and make it into a solution practically realizable and applicable, without any deadlock. As a by-product, example embodiments of the invention also create a new business service for the vendor to provide the Function Model and the Objective Measurement Model specifically according to the operator's technical objectives given any time before and during the actual network operations.

Note that the terms "vendor" and "operator" are used in this application to distinguish a party having knowledge on the technical details of the network (elements) and a party operating the network based on technical objectives and/or business objectives and/or strategic objectives. For example, "vendor" and "operator" may belong to different companies, or they may belong to a same company (e.g. to different departments thereof).

Method A: Co-definition Method of Function Model and Objective Measurement Model FIG. 2 shows an architecture model according to an example embodiment of the invention.

Figure 2:
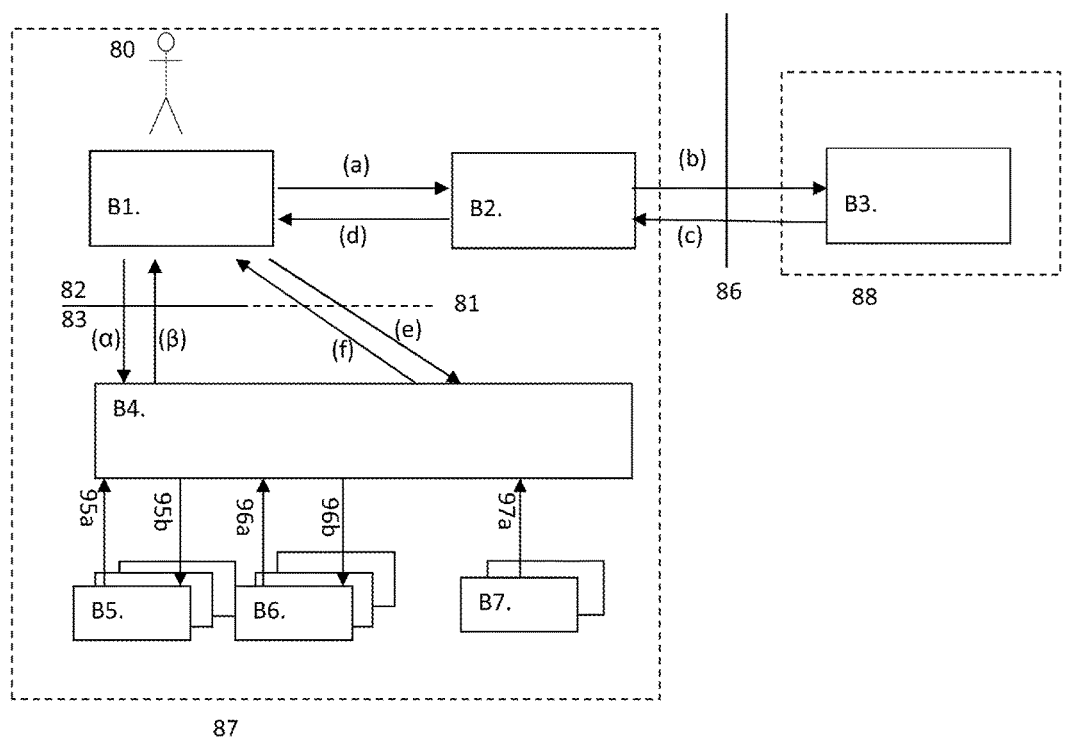
FIG. 2 shows a functional architecture according to an example embodiment of the invention.

The architectural model of FIG. 2 provides a practical way to solve at least one of the aforementioned problems. Inter alia, it defines a method to enable co-definition of the models by the operator and the vendor(s) any time before and during network operations, which solves at least one of the aforementioned Problems 1 and 2.

The following components with their respective tasks are shown in FIG. 2:

B1: SON Objective Manager (operator specific, may include UI)—(IRP manager)
 1. Request the generation of Function Model based on specific Objective data set by the operator 80.
 2. Generate all the relevant SCV policy sets with the Objective Model and the Function Model.
 3. Configure all the SCV sets and the OSn indexed Objective Measurement Model.
 4. Monitor and Present objective achievement reported in the form of *(OSn: value).

B2. Model Manager
 stores:
 Objective Model Data
 Context Model data, and if any
 the vendor-made Function Model(s) and Objective Measurement Model(s);
 provides the interface 86 between SON Objective Manager of the operator and Server of Function Model of the vendor
 Note that SON Objective Manager and Model Manager may collapse into a single manager.

B3. Server of Function Model
 Generate, search, and provide:
 the function model (i.e., Function Model indexed by OSn)
 the Objective Measurement Module (i.e., Methods to calculate the corresponding KPI/counter values of the Objectives from the relevant vendor-specific KPI/counter values.)
 Note: the above are provided to B2 based on the operator Objective data (including its related operation context) and the vendor-specific function implementation.

B4. SON Objective and Policy Manager (vendor specific)—(IRP Agent)
 1. Select the corresponding SCV value sets for the configuration of functions and function instances, according to the relevant context of the network.
 2. Objective Measurement Module monitors the vendor-specific PM/FM data and calculates the corresponding values for those Operator Objectives.
 3. Report the values for the Objectives to Operator, by Notification/OP-Notification.
 4. Configure vendor-specific function(s)/instances with the selected SCV value sets.

B5. (SON) Functions
B6. (SON) Function Instances
B7. Other Relevant Resources

B5 to B7 may be vendor specific. They may provide a respective context 95a, 96a, 97a to the SON Objective and Policy Manager B4, and the SON Function (instances) B5, B6 may be configured by respective configuration data 95b, 96b from the SON Objective and Policy Manager B4. There may be more or less than two SON Function (instances) B5, B6, and more than one other relevant resource B7.

As shown in FIG. 2, SON Objective Manager B1 and Model Manager B2 belong typically to the network management level 82, whereas SON Objective and Policy Manager B4 typically belongs to the element management level/network element level 83. These levels are connected via Itf-N 81, which may be standardized or not.

Correspondingly, as shown in FIG. 2, SON Objective Manager B1, Model Manager B2, SON Objective and Policy Manager B4, and SON Functions B5 to B7 typically belong to the operator's side 87, whereas the Server of Function Model B3 typically belongs to the vendor's side 88. These sides are connected via operator-vendor interface 86.

The method may work in the following actions:
 0) Before the start of this method, the operator defines/updates certain objectives, hereinafter named Objective Data. For example, the operator updates the objective data indexed with the objective sequence numbers ($OSn_i$, $OSn_j$, and $OSn_k$) in its Objectives Model directly or indirectly, anytime before and during the actual operation of the network.
  a) The operator then demands its Model Manager to further request the corresponding vendor to generate the corresponding Function Model(s) for the Objective Data indexed with $OSn_i$, $OSn_j$, and $OSn_k$, through the request Req(make func model for Objective OSn ijk).

b) The Model Manager requests the corresponding vendor to generate the corresponding Function Model(s) and implicitly the Objective Measurement Model for the Objective Data indexed with $OSn_i$, $OSn_j$, and $OSn_k$, through the request Req(make func model, URL of Objective Data(OSn ijk)).

c) The vendor's Server of Function Model responds the Model Manager with the corresponding Function Model and Objective Measurement Model if the generation is done successfully or, otherwise, the failure possibly with reason, through a response Response (Function Model, Objective Measurement Model, OSn ijk) or Response(failed <due to reason xyz>, OSn ijk) accordingly.

d) The Model Manager notifies the SON Objective Manager that the Function Model and Objective Measurement Model have been ready for use or are failed to make, through a response Notification(Function Model, Objective Measurement Model, ijk) or Notification (failed to make func model <due to reason xyz>, OSn ijk) accordingly.

Items (a) to (d) of the method show how the Function Model and Objective Measurement Model are generated by the vendor according the corresponding Objective data. This model co-definition method also provides a vendor with the service business opportunity even during the operations of the operator's network.

According to some example embodiments of the invention, the Server of Function Model B3 works as follows:

Before the actual model generation service, the vendor gets, from the operator, a set of properties and values (including their semantics) that are used by the operator to define any objectives that would be relevant to the vendor. This set of information is usually available based on an operator-vendor agreement. Based on this given set of information, the vendor then produces a set of the possible operation objectives including their possible operation context (e.g., network conditions). The vendor then generates the function models and the objective measurement models corresponding to the possible operation objectives including their possible operation context. These generated models are stored as entries, e.g., (operation objective, function model, objective measurement model)'s, in a database at "B3". They may be indexed by a URL or another kind of identifier.

After that, the Server of Function Model B3 is ready for the actual model generation service. According to some example embodiments of the invention, it works automatically as such:

1. When receiving Req(make func model, URL of relevant Objective data ijk indexed with OSn ijk) from Model Manager B2, Server of Function Model B3 accesses the URL for the relevant objective data ijk indexed with OSn ijk. From this URL, the vendor gets the objective data (indexed with OSn ijk).

2. Based on the set of properties and values (including their semantics) that are used by the operator to define any objectives, the Server of Function Model B3 searches its database to find the operation objective stored in the database, which is matching the operator-given objective. A matching is determined automatically by an algorithm in Server of Function Model B3, when this algorithm finds the operator given objective is semantically matching the stored operation objective. The algorithm may use certain reasoning methods.

3. When a matching operation objective for an operator given objective is found, Server of Function Model B3 responds to Model Manager B2 with Response(Function Model, Objective Measurement Model, OSn ijk), where the Function model and the Objective Measurement Model are the function model and objective measurement model in the entry of the matching operation objective. If Server of Function Model B3 cannot find the matching operation objective for the operator given objective, it responds to the Model manager B2 with Response(failed due to reason xyz, OSn ijk). At the same time, Server of Function Model B3 may also indicate the failure of matching to its vendor so that a corresponding new entry of (operation objective, function model, objective measurement model) might be generated and stored in the database accordingly by the vendor for a future use.

Objective Measurement Model

This model is generated by the vendor according to the operator-given Objective Data as the following. When a vendor makes an operator-specific Function Model for its vendor-specific function, the vendor first understands the definition of the operator-specific KPI(s)/other target(s) given in the Objective Data. Then, the vendor generates a formula (say, f) to calculate the corresponding operator-specific KPI(s)/target(s) with the vendor-specific measurements. The input of the formula is the values of the corresponding vendor-specific KPI(s) and possibly counters, taken currently and possibly also recently. The output of the formula is a value that shows the current achievement of the operator-specific KPI(s)/other target(s) given in the Objective Data.

Objective Measurement Model is thus defined as a set of objective indexes (OSn)s and their calculation formula pairs:

$$OSn_m : y_m = f_m(x_{m1}, x_{m2}, \ldots, x_{mn}), \text{ for every } m \in M$$

where, m is for operator objective m (i.e., $OSn_m$); M is a set of all the OSn indexes of those given operator objectives. For example, if Objective $OSn_i$, $OSn_j$, $OSn_k$ are given, M={i,j,k}.

Objective Measurement Model defines the approach for an operator to calculate the values specific to the operator's tech objectives through the relevant vendor-specific measurements, even if the operator has usually no sufficient knowledge on the vendor-specific KPIs/counters. For example, an operator has collected the following vendor-specific KPI measurement values (of the current/recent): $KPI_a=2\%$, $KPI_b=97.1\%$, $KPI_c=0.1\%$, $\Delta KPI_a=0.12\%$, and $\Delta KPI_c=0.2\%$, wherein $\Delta$ means a difference between two measurements (e.g. two subsequent measurements or two measurements with a predetermined period of time in between). These values of the vendor-specific measurements can be used to calculate the achievement value specific to the corresponding operator objectives:

$OSn_2 : f_2(KPI_a, KPI_c) = 3.7\%$; not satisfactory because the current $KPI_2$ value for Operator Objective$_2$ ($KPI_2 = f_2(KPI_a, KPI_c) \leq 3\%$);

$OSn_5 : f_5(\Delta KPI_a, \Delta KPI_c) = 99.5\%$. This means that $OSn_5$ is considered as optimized because $KPI_5 = f_5(\Delta KPI_a, \Delta KPI_c) \geq 99.0\%$.

Here, $f_2=3.7\%$, which tells the operator that Objective $OSn_2$ is violated and corresponding SON-Function$_2$ (defined in the function model) should be configured with a corresponding SCVSet to deal with it. On the other hand, $f_5$="Objective $OSn_5$ maximized", which tells the operator that Objective $OSn_5$ has been achieved and SON-function$_5$ can be stopped now or does not need to be started if yet.

The objective measurement model may be stored in the database of the Server of Function Model B3, together with the respective function model.

Method B: Method for an Operator to Map Relevant Vendor-specific Measurements into the Values Specific to Operator Objectives and Monitor them This approach works based on an Objective Measurement Model. After the Objective Measurement Model is ready for the operator to use, the operator can get the measurement reports corresponding to the operator Objectives, by the following method:

(α) The operator issues a request to the SON Objective Manager to report the objective achievement concerning Objective $OSn_i$, $OSn_j$, $OSn_k$ or all objectives if no OSn info has been given in the request. The report can be just a one-time report or event-based reports according to the reporting mode indicated in the request. The request can be made by an itf-N operation such as OP(Report Objective Achievement, <OSn ijk>, Mode), where Mode can be such as "once" and "event: Timer or other".

(β) SON Objective Manager reports the objective achievement concerning Objective $OSn_i$, $OSn_j$, $OSn_k$ or all objectives if no OSn info has been given in the request, according to the report Mode indicated in the request, by an itf-N notification such as Notification(*(OSn: value)).

It is the UI of SON Objective Manager, who compares the *(OSn: value) with the Objective target values. A human operator can thus know if the objectives have been achieved or not and, if yes, how good it is.

FIG. 2 also shows the interfaces between the components, as they are used according to the methods described hereinabove:

(a) Req(make func model for Objective OSn ijk);

(b) Req(make func model, URL of relevant Objective data ijk indexed with OSn ijk);

(c) Response(Function Model, Objective Measurement Model, OSn ijk) or Response(failed due to reason xyz, OSn ijk);

(d) Notification(func model created) or Notification(failed to make func model due to reason xyz);

(e) Configure(SCV policy sets, Measurement Model indexed with OSn); for Objective data under OSn ijk;

(f) Ack(SCV policy sets configured);

(α) OP(Report Objective Achievement, <OSn>, Mode);

(β) Notification (*(OSn: value));

Below are implementation examples of the interfaces shown in FIG. 2:

Implementation of Message (a) and (d)

This interface is operator internal and specific only to the operator. Any method taken by an operator is OK as long as it works.

Implementation of Message (b) and (c)

This interface is between an operator and a vendor. The operator and vendor must agree on the interface 86 between B2 and B3 first. Any method taken by them is OK as long as it supports message (b) and message (c). Additionally, it should support an URL based access for the objective data by B3.

Implementation of Message (e) and (f)

As one option, Method (e) and (f) as well as its info elements may be realized by using the standard itf-N Bulk CM IRP and its VsDataContainer IOC, defined in 3GPP TS 32.622 and its corresponding transportation methods. The VsDataContainer managed object is a container for vendor specific data. The number of instances of the VsDataContainer can differ from vendor to vendor. This IOC may only be used by the Bulk CM IRP for all the NRMs. Any SCV-related policy sets and objective measurement models may be put into the corresponding data elements of the bulk configuration files and, carried downwards through Interface itf-N 81. The corresponding notification of Bulk CM IRP can indicate upwards if the bulk configuration successful or not.

As another option, one may standardize the constructs of "If-THEN" for the SCV policy sets and the elements of the objective measurement model as part of a new interface, e.g. by 3GPP. Currently, there is no definition for any of such constructs.

Implementation of Message (α) and (β)

This interface may be supported by the standard OSS interface 81 itf-N. However, there are no such defined IRPs and IOCs in itf-N, which can directly make Interface itf-N to support the capability of monitoring the achievement of technical objectives during system operation. Hence, one may define the corresponding operation and notification for itf-N. It may be done via the following approach, for example:

First, an IRP Manager is defined for the part of the SON objective manager, which is over Interface itf-N. This IRP Manager realizes the human UI capability of the policy-based SON management system. The remaining part of the policy-based SON management system is implemented below Interface itf-N, where the corresponding IRP Agent is defined. This IRP Agent realizes all the other capabilities of the policy-based SON management system. Specific operation and notification may be defined between the IRP Manager and Agent, so that a human operator can then monitor the achievement of specific technical objectives during system operation. The specific operation and notification can be such as the operation objectiveAchievementRequest and the notification objectiveAchievementReport. They are defined as below.

Operation objectiveAchievementRequest allows the IRP-Manager (the human UI of the policy-based SON management system) to request the objective achievement data of specific objectives from the IRPAgent (the policy-based SON management system). The parameters of this operation may be defined according to Table 1.

TABLE 1

| Parameters of operation objectiveAchievementRequest | | | |
|---|---|---|---|
| Parameter Name | Qualifiers | Matching Information | Comment |
| operationId | M | operationId | Identifier of this objectiveAchievementRequest operation |
| objectiveNum | M | | This parameter indicates the number of specific objectives (as indicated below) where their achievement need to be reported. For example, they are as the n objectives identified below. |

TABLE 1-continued

Parameters of operation objectiveAchievementRequest

| Parameter Name | Qualifiers | Matching Information | Comment |
|---|---|---|---|
| $OSn_1$ | M | | This parameter indentifies the objective under objective sequence $number_1$ |
| ... | | | |
| $OSn_n$ | M | | This parameter indentifies the objective under objective sequence $number_n$ |

Notification objectiveAchievementReport allows the IRPAgent (the policy-based SON management system) to report its currently calculated values of the requested objectives to the IRPManager (the human UI of the policy-based SON management system). The parameters of this notification can be defined as what shown in Table 2.

TABLE 2

Parameters of notification objectiveAchievementReport

| Parameter Name | Qualifiers | Matching Information | Comment |
|---|---|---|---|
| operationId | M | operationId | Identifier of the related objectiveAchievementReport notification |
| $objAchievementValue_1$ | M | | This parameter reports the objective achievement value of the objective identified with $OSn_1$ |
| ... | | | |
| $objAchievementValue_n$ | M | | This parameter reports the objective achievement value of the objective identified with $OSn_n$ |

Figure 3:
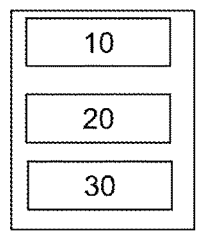
FIG. 3 shows an apparatus according to an example embodiment of the invention.
Figure 4:
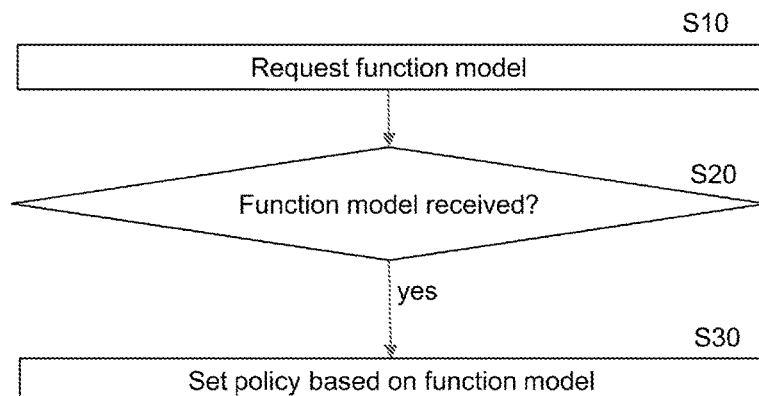
FIG. 4 shows a method according to an example embodiment of the invention.

FIG. 3 shows an apparatus according to an example embodiment of the invention. The apparatus may be a SON objective manager or an element thereof such as a Model Manager. FIG. 4 shows a method according to an example embodiment of the invention. The apparatus according to FIG. 3 may perform the method of FIG. 4 but is not limited to this method. The method of FIG. 4 may be performed by the apparatus of FIG. 3 but is not limited to being performed by this apparatus.

The apparatus includes requesting means 10 (such as a model requesting means), checking means 20 (such as a model checking means), and setting means 30 (such as policy setting means). The requesting means 10, checking means 20, and setting means 30 may be a requesting circuit, checking circuit, and setting circuit, respectively.

The requesting means 10 requests a function model based on a received objective for a network (S10). For example, the requesting means 10 may request the function model from a server of a function model.

The checking means 20 checks if a function model is received in response to the request for the function model (S20).

If the function model is received (S20="yes"), the setting means 30 sets a policy function according to the received function model (S30). In the policy function, a policy may be set according to the received function model, and/or a configuration may be set according to the received function model.

Figure 5:
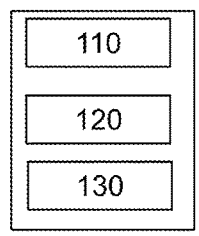
FIG. 5 shows an apparatus according to an example embodiment of the invention.
Figure 6:
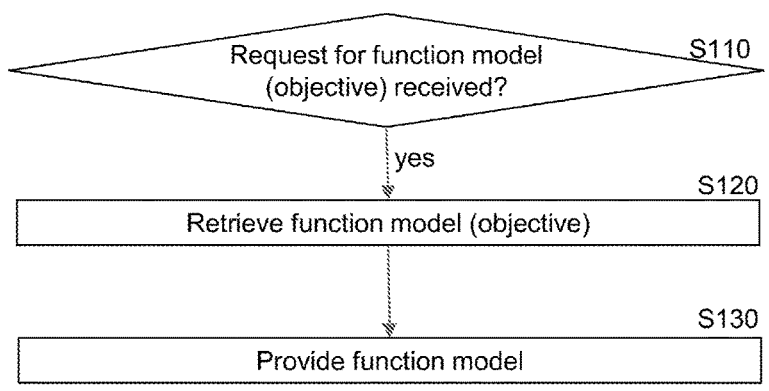
FIG. 6 shows a method according to an example embodiment of the invention.

FIG. 5 shows an apparatus according to an example embodiment of the invention. The apparatus may be a Server of a Function Model or an element thereof. FIG. 6 shows a method according to an example embodiment of the invention. The apparatus according to FIG. 5 may perform the method of FIG. 6 but is not limited to this method. The method of FIG. 6 may be performed by the apparatus of FIG. 5 but is not limited to being performed by this apparatus.

The apparatus includes monitoring means 110, retrieving means 120 (such as a model retrieving means), and providing means 130 (such as measurement providing means). The monitoring means 110, retrieving means 120, and providing means 130 may be a monitoring circuit, retrieving circuit, and providing circuit, respectively.

The monitoring means monitors if a request for a function model is received (S110). The request includes an indication of an objective for a network.

If the request is received (S110="yes"), the retrieving means 120 retrieves the function model from a storage device (S120). The retrieval is based on the indication of the objective.

The providing means 130 provides the function model in response to the request for the function model (S130).

Figure 7:
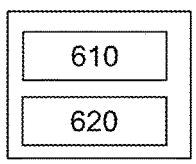
FIG. 7 shows an apparatus according to an example embodiment of the invention.

FIG. 7 shows an apparatus according to an example embodiment of the invention. The apparatus includes at least one processor 610, at least one memory 620 including computer program code, and the at least one processor 610, with the at least one memory 620 and the computer program code, being arranged to cause the apparatus to at least perform at least one of the methods according to FIGS. 4 and 6 and related description.

To make this solution or parts thereof multi-vendor capable, some of its corresponding messages and information elements crossing itf-N may be standardized e.g. by 3GPP, or they may become part of OSSii.

One piece of information may be transmitted in one or plural messages from one entity to another entity. Each of these messages may include further (different) pieces of information.

Names of network elements, protocols, and methods are based on current standards. In other versions or other technologies, the names of these network elements and/or protocols and/or methods may be different, as long as they provide a corresponding functionality.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software.

Some example embodiments of the invention may be applied to a 3GPP network (e.g. LTE, LTE-A, or a 5G network), as described hereinabove. However, some example embodiments of the invention may be applied to any kind of self-organizing network including, for example, other mobile networks such as WiFi, GSM, and fixed networks such as ATM.

According to the above description, it should thus be apparent that example embodiments of the present invention provide, for example an objective manager such as a SON objective manager, or a component thereof (such as a model manger), an apparatus embodying the same, a method for controlling and/or operating the same, and computer program(s) controlling and/or operating the same as well as mediums carrying such computer program(s) and forming computer program product(s). Furthermore, it should thus be apparent that example embodiments of the present invention provide, for example a server of a function model, or a component thereof, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques, means, entities, units, devices, or methods include, as non-limiting examples, implementations as hardware, software, firmware, special purpose circuits or logic, general purpose hardware or controller or other computing devices, a virtual machine, or some combination thereof.

It should be noted that the description of the embodiments is given by way of example only and that various modifications may be made without departing from the scope of the invention as defined by the appended claims.

The invention claimed is:

1. Apparatus of a self organizing network, comprising a processor configured to, during operation of the self organizing network:
request a function model based on an updated objective for the self organizing network;
check if a function model is received in response to the request for the function model;
set, if the function model is received, a policy function according to the received function model; and
apply the policy function in an operation of the self organizing network.

2. The apparatus according to claim 1, wherein the request includes an indication of the objective, and the indication includes a unified resource locator related to the objective.

3. The apparatus according to claim 1, further comprising:
request a measurement model based on the received objective;
check if the measurement model is received in response to the request for the measurement model;
set, if the measurement model is received, a measurement function according to the received measurement model.

4. The apparatus according to claim 3, wherein the measurement model includes at least one of a first counter to be measured and a performance indicator to be calculated based on a second counter and a third counter different from the second counter.

5. The apparatus of claim 1, wherein the objective comprises at least one of a business policy, a strategic policy and a technical policy.

6. Apparatus of a self organizing network, comprising a processor configured to, during operation of the self organizing network:
monitor if a request for a function model is received, wherein the request includes an indication of an updated objective for the self organizing network;
retrieve, if the request is received, based on the indication, the function model from a storage device; and
provide the function model in response to the request, so that a policy function according to the function model can be applied in an operation of the self organizing network.

7. The apparatus according to claim 6, wherein the indication includes a unified resource locator.

8. The apparatus according to claim 6, wherein at least one of an objective data and the function model is stored in a database on the storage device, and wherein the objective data corresponds to the indication of the objective.

9. The apparatus according to claim 6, wherein the processor is further configured to:
retrieve, if the request is received, an objective measurement model from the storage device; and
provide the objective measurement model in response to the request.

10. A method implemented in a processor of a self organizing network, comprising:
requesting during operation of the self organizing network, a function model based on a received updated objective for the self organizing network;
checking during operation of the self organizing network, if a function model is received in response to the request for the function model;
setting during operation of the self organizing network, if the function model is received, a policy function according to the received function model; and
applying the policy function in an operation of the self organizing network.

11. The method according to claim 10, wherein the request includes an indication of the objective, and the indication includes a unified resource locator related to the objective.

12. The method according to claim 10, further comprising:
requesting a measurement model based on the received objective;
checking if the measurement model is received in response to the request for the measurement model;
setting, if the measurement model is received, a measurement function according to the received measurement model.

13. The method according to claim 12, wherein the measurement model includes at least one of a first counter to be measured and a performance indicator to be calculated based on a second counter and a third counter different from the second counter.

14. A method implemented in a processor of a self organizing network, comprising:

monitoring during operation of the self organizing network, if a request for a function model is received, wherein the request includes an indication of an updated objective for the self organizing network;

retrieving during operation of the self organizing network, if the request is received, based on the indication, the function model from a storage device; and providing during operation of the self organizing network, the function model in response to the request, so that a policy function according to the function model can be applied in an operation of the self organizing network.

15. The method according to claim 14, wherein the indication includes a unified resource locator.

16. The method according to claim 14, wherein at least one of an objective data and the function model is stored in a database on the storage device, and wherein the objective data corresponds to the indication of the objective.

17. The method according to claim 14, further comprising:

retrieving, if the request is received, an objective measurement model from the storage device; and providing the objective measurement model in response to the request.

* * * * *